United States Patent
Lee et al.

(10) Patent No.: US 9,525,161 B2
(45) Date of Patent: Dec. 20, 2016

(54) RECHARGEABLE BATTERY

(71) Applicant: SAMSUNG SDI CO., LTD., Yongin-si, Gyeonggi-do (KR)

(72) Inventors: Chi-Young Lee, Yongin-si (KR); Seok-Yoon Yoo, Yongin-si (KR); Yun-Jung Kwak, Yongin-si (KR); Jeong-Won Oh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 438 days.

(21) Appl. No.: 14/149,764

(22) Filed: Jan. 7, 2014

(65) Prior Publication Data
US 2015/0024259 A1    Jan. 22, 2015

Related U.S. Application Data

(60) Provisional application No. 61/847,798, filed on Jul. 18, 2013.

(51) Int. Cl.
   *H01M 2/26*   (2006.01)
   *H01M 2/22*   (2006.01)

(52) U.S. Cl.
   CPC ............... *H01M 2/26* (2013.01); *H01M 2/22* (2013.01)

(58) Field of Classification Search
   CPC ............ H01M 2/22; H01M 2/26; H01M 2/20; H01M 2/30–2/307; H01M 2/34–2/348
   See application file for complete search history.

(56) References Cited

U.S. PATENT DOCUMENTS

| | | |
|---|---|---|
| 6,193,765 B1 | 2/2001 | Nakanishi et al. |
| 7,762,855 B2 | 7/2010 | Yoon et al. |
| 8,440,334 B2 | 5/2013 | Kim |
| 2004/0038122 A1 | 2/2004 | Hisamitsu et al. |
| 2006/0263683 A1 | 11/2006 | Yoon et al. |
| 2010/0239902 A1 | 9/2010 | Hisamitsu et al. |
| 2010/0247989 A1 | 9/2010 | Kim |
| 2010/0263201 A1 | 10/2010 | Hisamitsu et al. |
| 2013/0295430 A1 | 11/2013 | Kurahashi |

FOREIGN PATENT DOCUMENTS

| | | |
|---|---|---|
| EP | 0 413 867 A2 | 2/1991 |
| EP | 2 515 362 A2 | 10/2012 |
| EP | 2 602 847 A1 | 6/2013 |
| EP | 2 772 963 A1 | 9/2014 |
| JP | 2004-87260 A | 3/2004 |
| KR | 10-2006-0116049 | 11/2006 |
| KR | 10-2010-0108854 | 10/2010 |
| WO | WO 2012/029944 A1 | 3/2012 |

OTHER PUBLICATIONS

EPO Office action dated Feb. 26, 2016, for corresponding European Patent application 14153492.5, (5 pages).
Extended European Search Report for European patent application No. 14153492.5 mailed by the EPO on Sep. 17, 2014, 10 pgs.

*Primary Examiner* — Christina Chern
(74) *Attorney, Agent, or Firm* — Lewis Roca Rothgerber Christie LLP

(57) ABSTRACT

Disclosed is a rechargeable battery including a case, an electrode assembly accommodated in the case, a first terminal unit electrically coupled to the electrode assembly, and a first current collector including a first portion coupled with the electrode assembly, a second portion coupled with the first terminal unit, and a connection unit coupling the first portion and the second portion and having a thickness that is greater than the thickness of the first portion.

11 Claims, 10 Drawing Sheets

RECHARGEABLE BATTERY

CROSS-REFERENCE TO RELATED APPLICATION

This application claims priority to and the benefit of U.S. Provisional Application No. 61/847,798, filed on Jul. 18, 2013 in the U.S. Patent and Trademark Office, the entire content of which is incorporated herein by reference.

BACKGROUND

1. Field

The described technology relates to a rechargeable battery.

2. Description of the Related Art

A rechargeable battery is a battery that can be charged and discharged. A rechargeable battery having a low capacity is used in a small portable electronic device such as a mobile phone, a laptop computer, or a camcorder. A battery having a large capacity is used as a power source for driving a motor or an electric power storing device having a large capacity in a hybrid vehicle.

A high power rechargeable battery including a non-aqueous electrolyte having a high energy density has been developed. The high power rechargeable battery is constituted by a battery module having a large capacity and includes a plurality of rechargeable batteries coupled in series to drive devices utilizing large electric power, for example, motors for electric vehicles. The rechargeable battery may have cylindrical and angular shapes.

Further, a current collecting member electrically coupling an electrode assembly accommodated in a case and a terminal protruding to the outside of the case is used to charge or discharge the rechargeable battery.

Accordingly, the current collecting member is positioned between the terminal and the electrode assembly when the rechargeable battery is charged or discharged, thus electrically coupling the terminal and the electrode assembly.

However, when the rechargeable battery is repeatedly charged and discharged, even though a current passing through the current collecting member is a low current, a temperature of the current collecting member increases, which may deform the current collecting member.

Further, when the rechargeable battery is charged or discharged, if a high current flows through the current collecting member, the current collecting member is damaged.

The above information disclosed in this Background section is for enhancement of understanding of the background of the described technology and therefore it may contain information that does not form the prior art that is already known in this country to a person of ordinary skill in the art.

SUMMARY

The described aspects have been made to provide a rechargeable battery including a current collector having a structure to improve heat capacity, thermal conductivity, and durability.

According to a first aspect, a rechargeable battery is described, including a case; an electrode assembly accommodated within the case; and a current collector having a first portion, a second portion, and a connection unit between the first portion and the second portion, the first portion being coupled with the electrode assembly, the second portion being coupled with a first battery terminal unit, wherein a thickness of the connection unit is greater than a thickness of the first portion of the current collector.

The connection unit may include a body coupling the first portion with the second portion, and a reinforcement member, wherein a thickness of the reinforcement member is greater than a thickness of the first portion of the current collector.

The reinforcement member may be configured to be coupled to the body along substantially planar surfaces of the body.

The reinforcement member may include at least a first reinforcement member extending from a first side of the body.

The first reinforcement member may be configured to be folded over and coupled to a first planar surface of the body.

The reinforcement member further includes a second reinforcement member extending from a second side of the body opposite to the first side, wherein the second reinforcement member is configured to be folded over and coupled to a second planar surface of the body.

A thickness of the first reinforcement member and a thickness of the second reinforcement member may be substantially identical to a thickness of the body.

The thickness of the connection unit may be a sum of a thickness of the body and a thickness of the reinforcement member.

The connection unit including the body and the reinforcement member may have a thermal conductivity that is higher than a thermal conductivity of the first portion and the second portion.

A surface area of the connection unit including the body and the reinforcement member may be greater than a surface area of the first portion or the second portion of the current collector that is coupled to the terminal unit.

The first portion of the current collector may include a plurality of collector shoes extending from the body.

The reinforcement member may be between the plurality of collector shoes.

The body may include a first body, and a second body, the first body being coupled with the first portion of the current collector, the second body being coupled with the second portion of the current collector.

The reinforcement member may extend from the first body.

The reinforcement member may extend from the second body.

The thickness of the connection unit may be greater than a thickness of the second portion of the current collector.

A heat capacity of the connection unit may be greater than a heat capacity of the first portion and the second portion.

DETAILED DESCRIPTION

Figure 1:
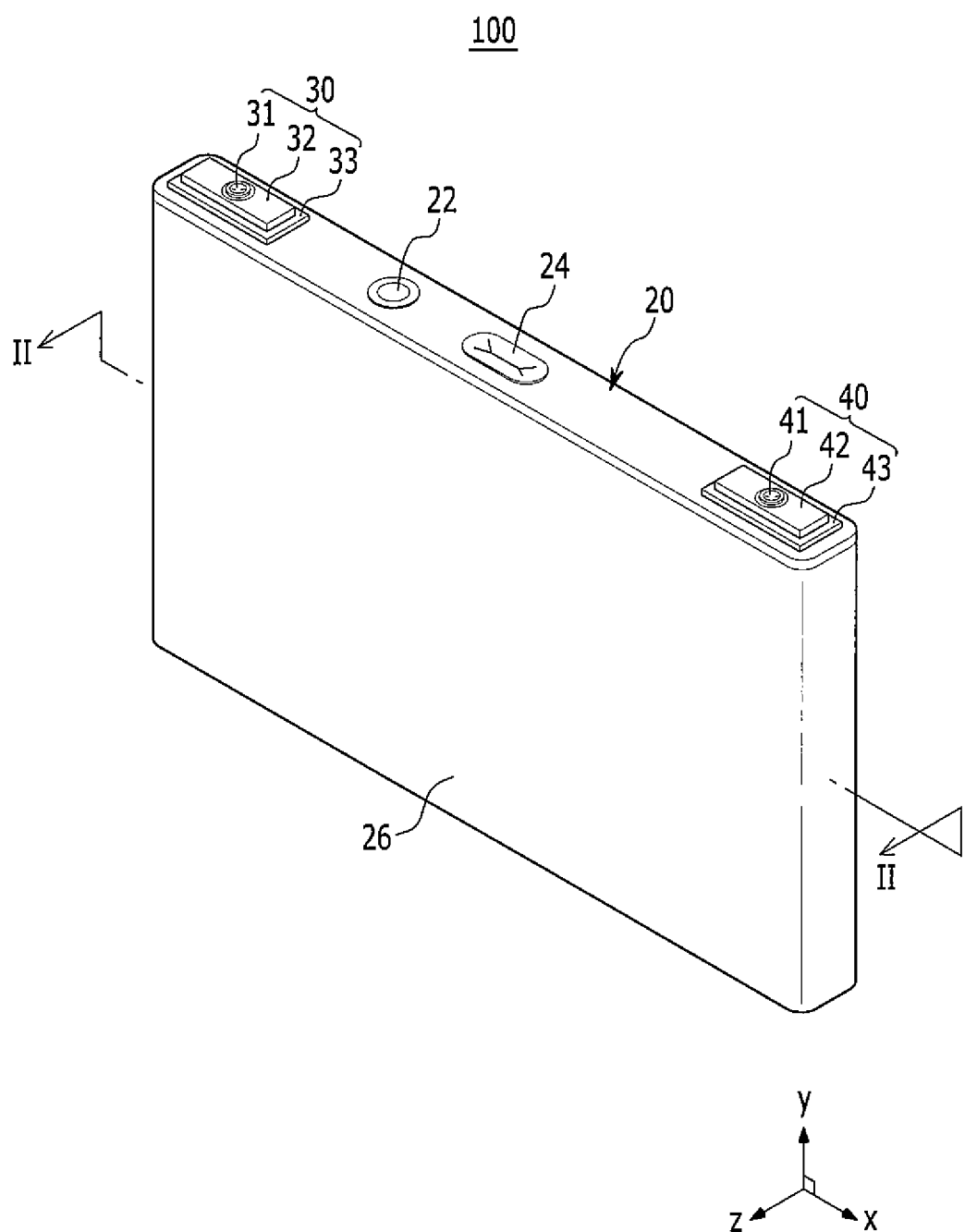
FIG. 1 is a perspective view of a rechargeable battery according to a first example embodiment of the present invention.

Hereinafter, aspects of various embodiments of the present invention will be described in more detail with reference to the accompanying drawings so that those skilled in the art may easily practice the embodiments of the present invention. As those skilled in the art would realize, the described embodiments may be modified in various different ways, without departing from the spirit or scope of the present invention.

In the drawings, the dimensions of layers or regions may be exaggerated for clarity of description. It will be understood that when a layer or element is referred to as being "on" another layer or substrate, it may be directly on the other layer or element, or intervening layers or elements may be present. In addition, it will be understood that when a layer is referred to as being "under" another layer, it may be directly under the other layer or one or more intervening layers, may be present. Moreover, it will be understood that when a layer is referred to as being "between" two layers, there may be only one layer between the two layers or one or more intervening layers may be present. In the drawings and description, like reference numerals designate like elements throughout the specification. Expressions such as "at least one of," when preceding a list of elements, modify the entire list of elements and do not modify the individual elements of the list. Further, the use of "may" when describing embodiments of the present invention refers to "one or more embodiments of the present invention."

Figure 2:
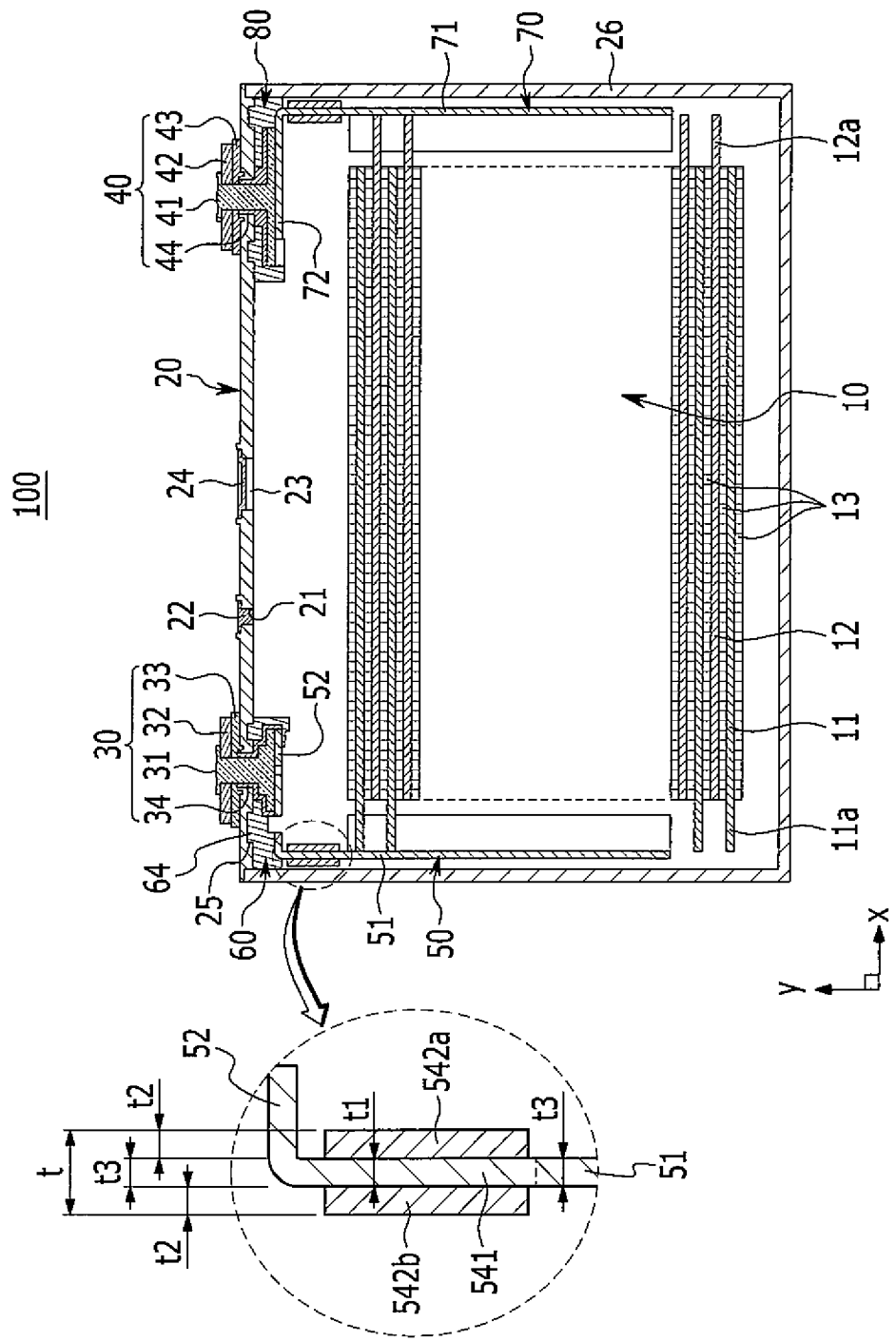
FIG. 2 is a cross-sectional view taken along line II-II of FIG. 1.

FIG. 1 is a perspective view showing a rechargeable battery 100 according to a first example embodiment of the present invention. FIG. 2 is a cross-sectional view taken along the line II-II of FIG. 1.

Referring to FIGS. 1 and 2, a rechargeable battery 100 according to the present example embodiment includes an electrode assembly 10 formed by interposing a separator 13 between a first electrode 11 and a second electrode 12, and winding the separator 13; a case 26 in which the electrode assembly 10 is received; a first terminal unit 30 and a second terminal unit 40 coupled to the electrode assembly 10 and a first current collector 50 or a second current collector 70; a cap plate 20 fastened to an opening formed in the case 26; and first and second insulating members 60 and 80 provided in the case 26.

The rechargeable battery 100 according to the present example embodiment will be described with reference to an example angular shape lithium ion rechargeable battery.

However, the embodiments of the present invention is not limited thereto, and may be applied to, for example, a cylindrical battery.

Further, the first electrode 11 may be constituted by a cathode and the second electrode 12 may be constituted by an anode. Alternatively, the first electrode 11 may be constituted by the anode and the second electrode 12 may be constituted by the cathode.

The electrode assembly 10 may have a shape similar to a jelly roll (e.g., a rolled cake with jelly between the cake layers) by winding the first electrode 11, the second electrode 12, and the separator 13 together.

The first electrode 11 and the second electrode 12 may include the first and the second current collectors 50 and 70, each including a metal foil of a thin plate, and an active material applied on a surface of each of the first and the second current collectors 50 and 70. Further, the first electrode 11 and the second electrode 12 may be divided into coating portions in which the active material is applied on the first and the second current collectors 50 and 70, and a first electrode uncoated region 11a and a second electrode uncoated region 12a in which the active material is not applied on the first and the second current collectors 50 and 70.

However, the present invention is not limited thereto, and the electrode assembly 10 may have a structure in which the first electrode 11 and the second electrode 12 including a plurality of sheets are laminated with the separator 13 interposed therebetween.

The first terminal unit 30 may be electrically coupled to the first electrode uncoated region 11a of the electrode assembly 10 through a medium of the first current collector 50. The second terminal unit 40 may be electrically coupled to the second electrode uncoated region 12a through a medium of the second current collector 70.

Further, the first and the second terminal units 30 and 40 may be positioned at opposite ends of the cap plate 20 and protrude through the cap plate 20 to be exposed to the outside of the rechargeable battery 100.

The cap plate 20 includes a thin board, and is fastened to the opening of the case 26 to seal the case 26 after the electrode assembly 10 is received (or accommodated) in the case 26.

Herein the present disclosure, the case 26 having an angular shape according to the embodiments of the present invention are illustrated by way of example. However, the shape of the case 26 is not limited to the angular shape, and the case 26 may have, for example, a cylindrical shape.

An electrolyte injection opening 21 for injecting an electrolyte solution into the sealed case 26 is formed through the cap plate 20. The electrolyte injection opening 21 may be sealed by a sealing stopper 22 after the electrolyte solution is injected.

Further, a vent hole 23 having a vent plate 24 that is fractured (or otherwise 54b opened) when an internal pressure of the sealed case 26 reaches or exceeds a predetermined (or set) pressure is formed through the cap plate 20.

The first and the second terminal units 30 and 40 may include first and second rivets 31 and 41, first and second terminal plates 32 and 42, a first terminal insulating member 33 and a conductive connection member 43 provided between the first and the second terminal plates 32 and 42, respectively, and the cap plate 20, and first and second gaskets 34 and 44.

According to the present example embodiment, the cap plate 20 may be electrically coupled to the second terminal unit 40 by the conductive connection member 43. Therefore, the cap plate 20 can have a polarity of a cathode or an anode.

Further, the first and the second current collectors 50 and 70 include first portions 51 and 71 coupled with the first and the second electrodes 11 and 12, respectively, and second portions 52 and 72 coupled with the first and the second terminal units 30 and 40, respectively.

Further, an insulating member can be provided between the cap plate 20 and the second terminal plate 42 instead of the conductive connection member 43. In this case, the cap plate 20 is not electrically coupled to the second terminal unit 40.

Figure 3A:
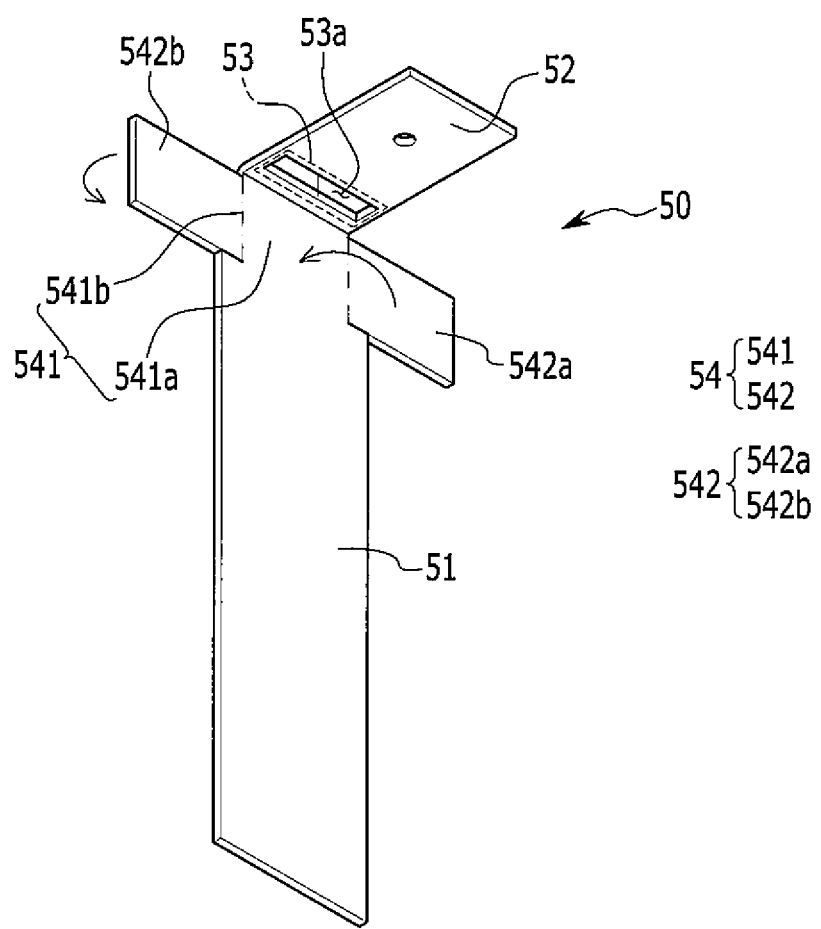
FIGS. 3A and 3B are perspective views of a first current collector according to a first example embodiment of the present invention.
Figure 3B:
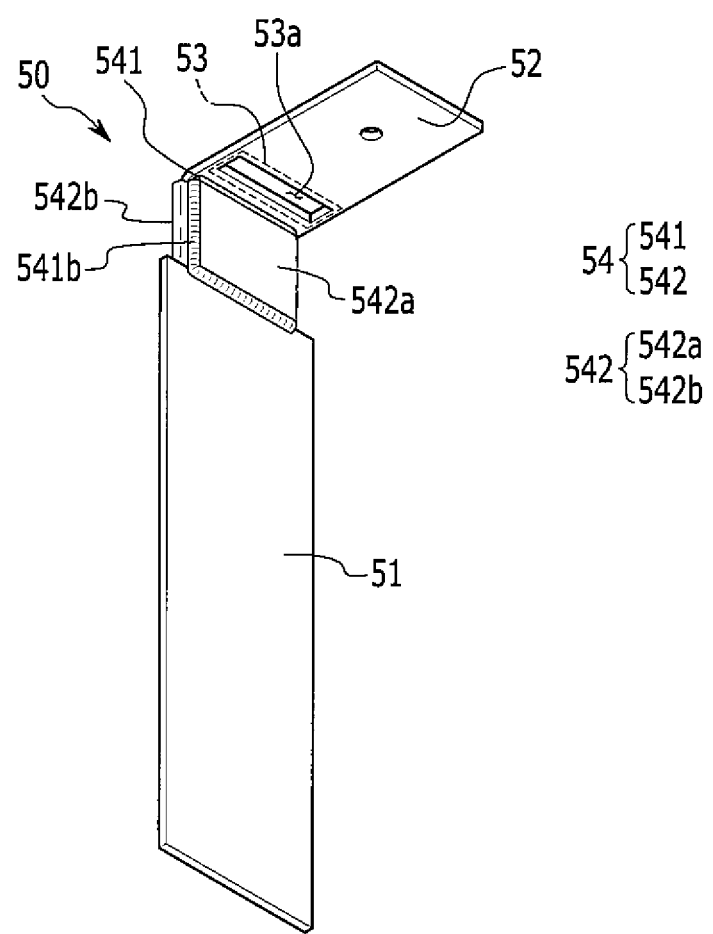

FIGS. 3A and 3B are perspective views of the current collector according to the first example embodiment of the present invention.

Figure 4:
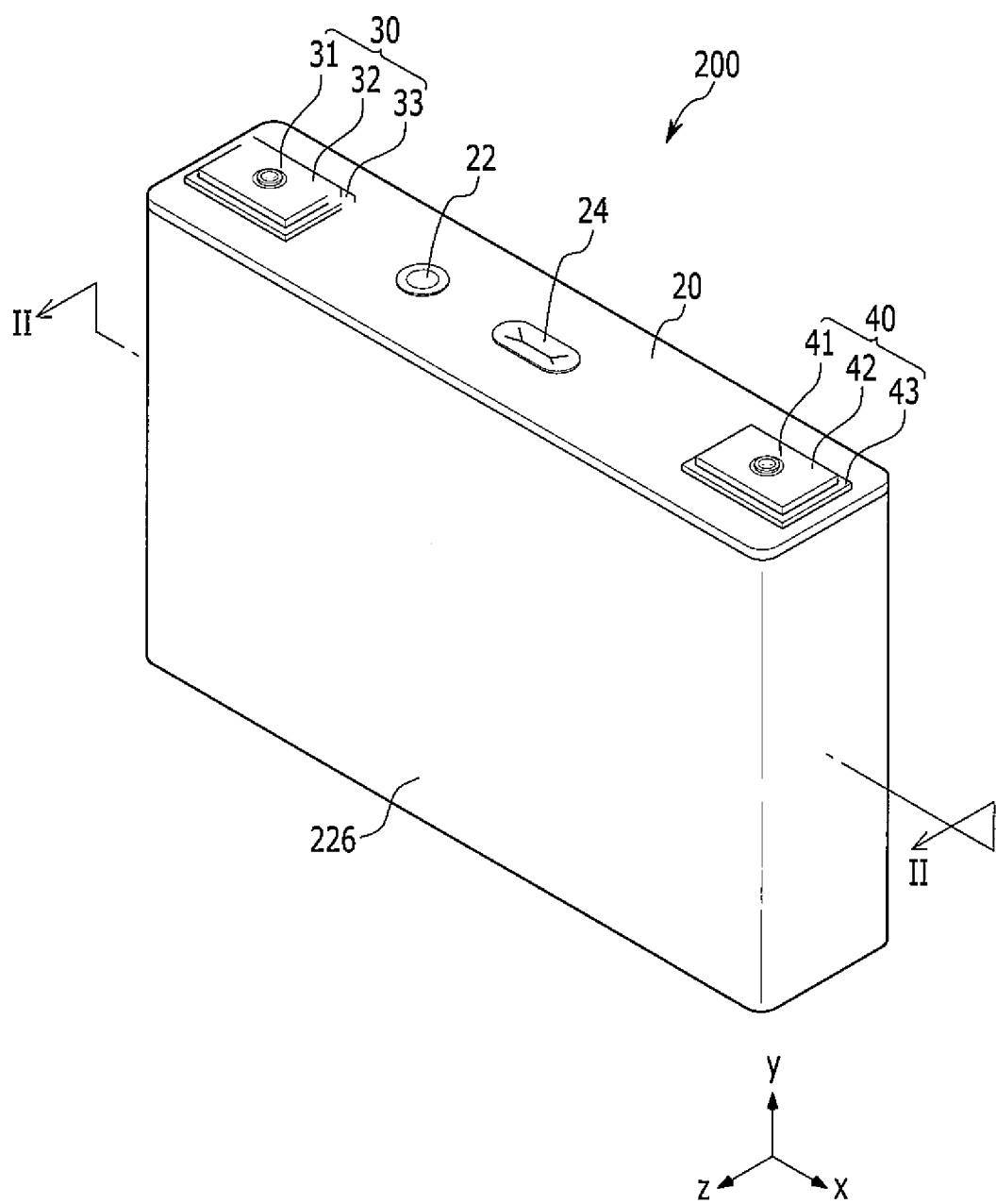
FIG. 4 is a perspective view of a rechargeable battery according to a second example embodiment of the present invention.

Referring to FIGS. 3A, 3B and 4, the first current collector 50 according to the example embodiment of the present invention includes the first portion 51 coupled with the first uncoated region 11a of the electrode assembly 10, the second portion 52 coupled with the terminal unit 30 and including a fuse portion 53 through which a fuse hole 53a is formed, and a connection unit 54 positioned between the first portion 51 and the second portion 52 to couple the first portion 51 and the second portion 52. The connection unit 54, together with the first portion 51 and the second portion 52 make up the first current collector 50.

Herein, the first current collector 50 and the second current collector 70 according to the present example embodiment may have the same structure. Accordingly, hereinafter, a detailed description of the second current collector 70 will be omitted.

Referring back to FIG. 2, a thickness t of the connection unit 54 according to the present example embodiment is larger than a thickness t3 of the first portion 51.

Herein, the thickness of the second portion 52 according to the present example embodiment is the same as the thickness t3 of the first portion 51.

Further, the thickness t of the connection unit 54 according to the present example embodiment is larger than the thickness of the second portion 52.

In more detail, the connection unit 54 according to the present example embodiment includes a body 541 coupling the first portion 51 and the second portion 52, and a reinforcement member 542 coupled with the body 541.

Herein, the thickness of the reinforcement member 542 according to the present example embodiment may be the same as a thickness t1 of the body 541.

The reinforcement member 542 according to the present example embodiment may extend from the body 541 and then bent (or folded) to be coupled with the body 541.

In this case, the body 541 and the reinforcement member 542 may be coupled by a method such as, for example, riveting, caulking, or welding.

Further, the reinforcement member 542 according to the present example embodiment may include one or more of a first reinforcement member 542a coupled with a first surface 541a of the body 541, and a second reinforcement member 542b coupled with a second surface 541b positioned at an opposite side of the first surface 541a of the body 541 and facing an internal wall of the case 26.

In more detail, the first reinforcement member 542a according to the present example embodiment may extend in a direction parallel to the first surface 541a, and the second surface 541b between the first surface 541a and the second surface 541b of the body 541 and then bent (or folded) to be coupled with the first surface 541a of the body 541.

Further, the second reinforcement member 542b according to the present example embodiment may be coupled to the body 541 from a side opposite the first reinforcement member 542a, and extend in a direction parallel to the first reinforcement member 542a and then bent (or folded) to be coupled with the second surface 541b of the body.

According to the present example embodiment, the thickness t of the connection unit 54 of the first current collector 50 is equal to a sum of the thickness t1 of the body and the thickness t2 of the first and the second reinforcement members 542a and 542b.

Herein, the thickness t3 of the first portion 51 and the second portion 52 of the first current collector 50 is the same as the thickness t1 of the body 541.

Further, the thickness t2 of the first and the second reinforcement members 542a and 542b may be the same as or smaller than the thickness t3 of the first and the second portions 51 and 52.

Alternatively, the thickness t2 of the first and the second reinforcement members 542a and 542b may be larger than the thickness t3 of the first and the second portions 51 and 52.

Accordingly, the thickness t of the connection unit 54 according to the present example embodiment is larger than the thickness of the first portion 51 and the second portion 52 with the exception of the connection unit 54 in the first current collector 50.

For example, when the thickness t2 of the first and the second reinforcement members 542a and 542b is the same as the thickness t3 of the first and the second portions 51 and 52, the thickness t of the connection unit 54 is almost about three times larger than the thickness of the first and the second portions 51 and 52.

A heat capacity is a capacity required to increase a temperature of a predetermined material by 1° C. or 1 Kelvin, and a size of the heat capacity is proportional to a mass.

Accordingly, the thickness t of the connection unit 54 of the first current collector 50 is larger than the thickness t3 of the first and the second portions 51 and 52 and the mass of the connection unit 54 is larger than that of the first and the second portions 51 and 52. Therefore, the heat capacity of the connection unit 54 is larger than the heat capacity of the first and the second portions 51 and 52.

Further, thermal conductivity is a property of material to conduct heat. The thermal conductivity may be represented by a thermal conductive ratio which is proportional to a surface area of an object.

Accordingly, a surface area of the connection unit 54 of the first current collector 50 is larger than the surface area of the first portion 51 or the second portion 52 by approximately a cross-sectional area of the reinforcement member 542. Therefore, the thermal conductivity of the connection unit 54 is greater than the thermal conductivity of the first or the second portions 51 and 52.

The connection unit 54 according to the present example embodiment couples the first portion 51 (that is, a portion in which the first current collector 50 and the electrode assembly 10 are coupled) with the second portion 52 (that is, a portion coupled with the first terminal unit 30), and is positioned in the case 26 sealed by the cap plate 20.

When the rechargeable battery 100 is charged at a high voltage or discharged at a high voltage, a current that is larger than a current capable of being received by the electrode assembly 10 or the first terminal unit 30, per unit time, may be supplied through the first current collector 50 to the electrode assembly 10 or the first terminal unit 30.

In this case, a residual current other than the current supplied to the electrode assembly 10 or the first terminal unit 30 remains in the connection unit 54 positioned between the first portion 51 and the second portion 52 of the first current collector 50.

Accordingly, heat that is hotter than that of the first portion 51 and the second portion 52 is generated due to the residual current in the connection unit 54 of the first current collector 50. Therefore, damage or deformation may occur due to the heat of the connection unit 54.

The heat capacity of the connection unit 54 according to the present example embodiment is larger than the heat capacity of the first portion 51 and the second portion 52, and the thermal conductivity of the connection unit 54 is larger than that of the first portion 51 and the second portion 52. Accordingly, the connection unit 54 may not be easily heated and the heat generated from the connection unit 54 may be rapidly emitted.

Therefore, according to the present example embodiment, even though charging and discharging of the rechargeable battery 100 are repeated, the connection unit 54 of the first current collector 50 may be prevented or reduced from being damaged or deformed.

Further, the connection unit 54 according to the present example embodiment is not physically coupled with the electrode assembly 10 and the first terminal unit 30. Accordingly, the connection unit 54 may be damaged or deformed due to an external impact applied to the rechargeable battery 100.

According to the present example embodiment, the thickness t of the connection unit 54 is larger than the thickness t3 of the first portion 51 and the second portion 52. Therefore, durability of the connection unit 54 is increased.

Therefore, according to the present example embodiment, even though the external impact is applied to the rechargeable battery 100, the connection unit 54 of the first current collector 50 may be prevented or reduced from being damaged or deformed.

Figure 5:
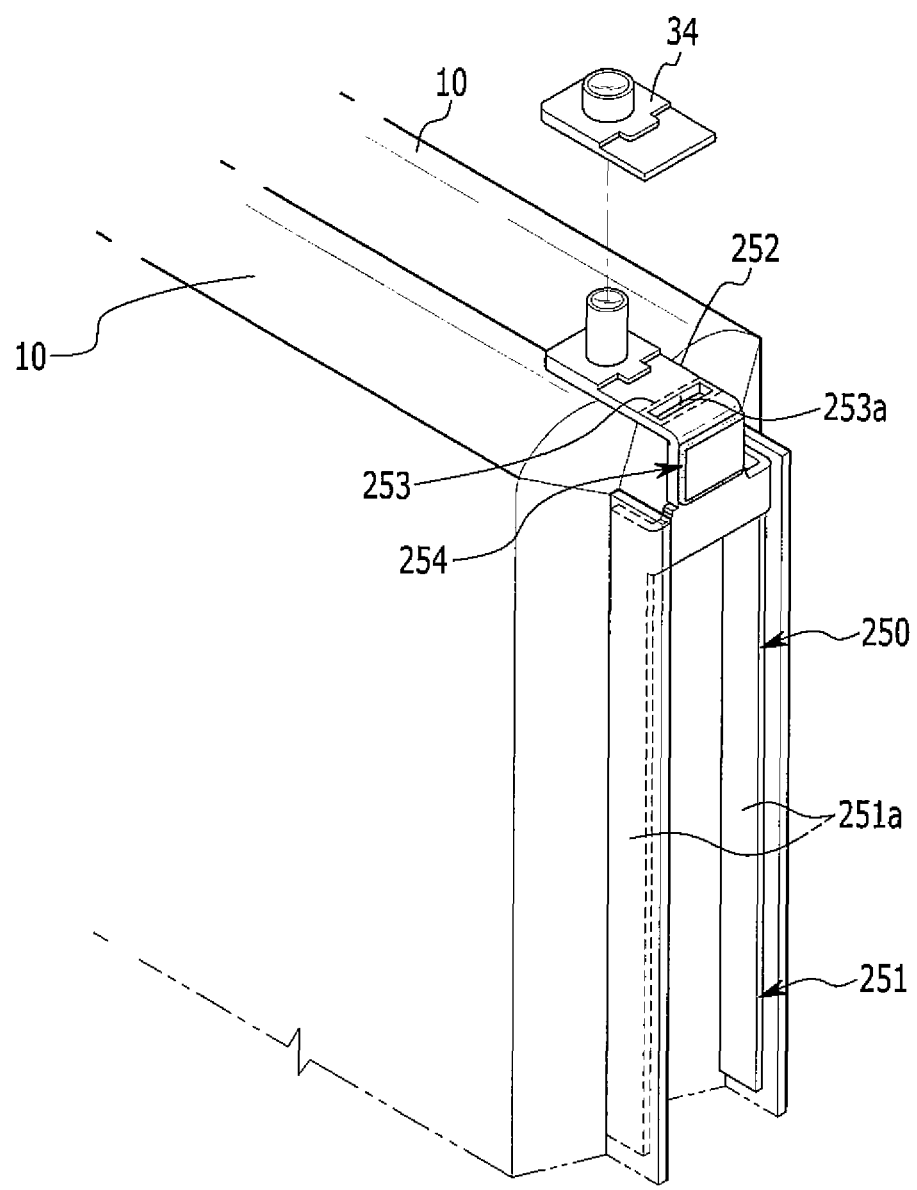
FIG. 5 is a partially exploded perspective view of the rechargeable battery according to the second example embodiment of the present invention.

FIG. 4 is a perspective view of a rechargeable battery according to a second example embodiment of the present invention. FIG. 5 is a partially exploded perspective view of the rechargeable battery according to the second example embodiment of the present invention.

Figure 6A:
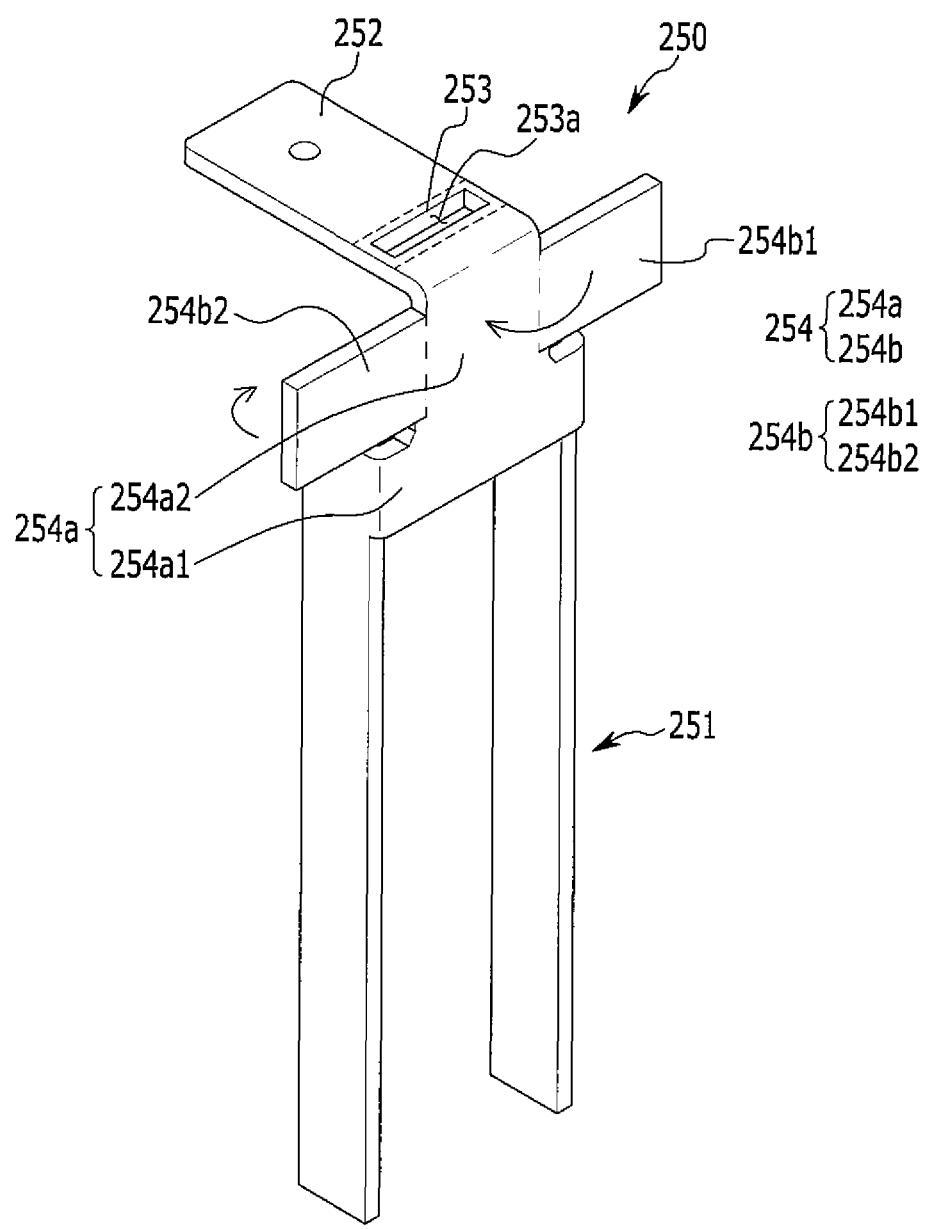
FIGS. 6A and 6B are perspective views of the first current collector according to the second example embodiment of the present invention.
Figure 6B:
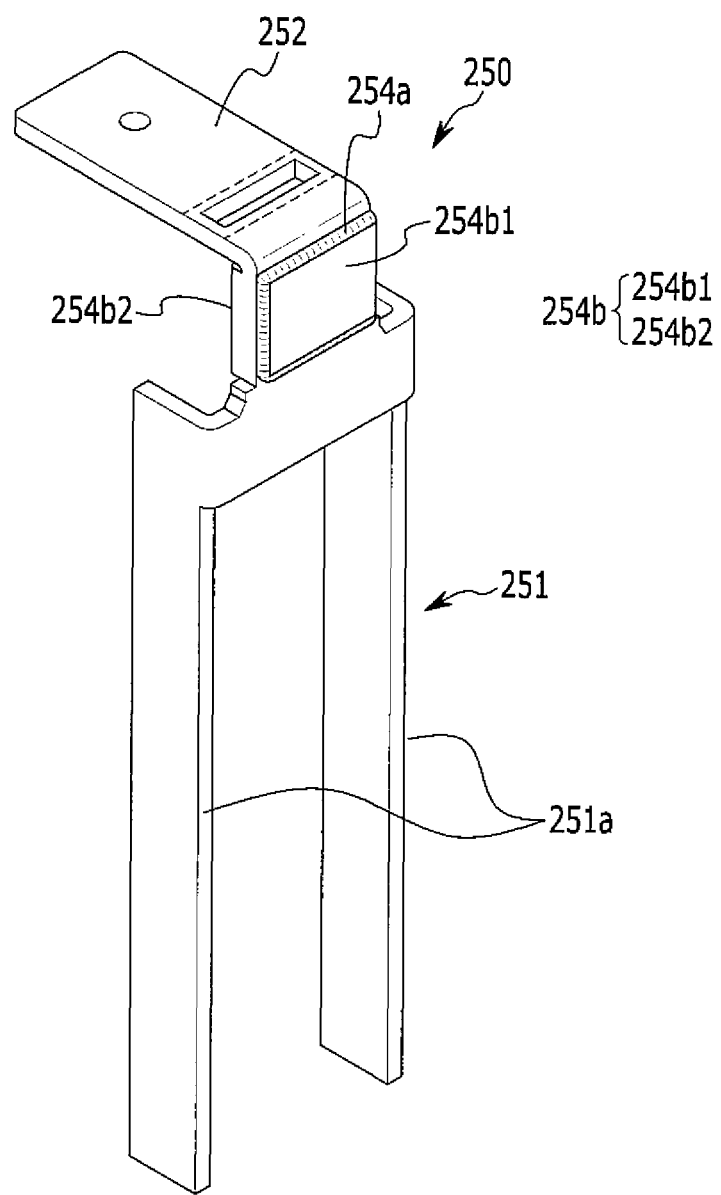

Further, FIGS. 6A and 6B are perspective views of a first current collector according to the second example embodiment of the present invention.

Referring to FIGS. 4, 5, 6A and 6B, a rechargeable battery 200 according to the present example embodiment has substantially the same constitution as the rechargeable battery 100 according to the first example embodiment of the present invention with the exception of a first current collector 250.

Accordingly, hereinafter, a detailed description of the same constitution as the rechargeable battery 100 according to the first example embodiment of the present invention will be omitted.

Referring to FIGS. 4, 5, 6A and 6B, the electrode assembly according to the present example embodiment may include a plurality of electrode assemblies 10.

According to the present example embodiment, as shown in FIG. 5, the two electrode assemblies 10 may be received in the case 26 to constitute the rechargeable battery 200.

Further, the first current collector 250 according to the present example embodiment includes a first portion 251 coupled with the first uncoated region 11a of the electrode assembly 10, a second portion 252 coupled with the terminal unit 30 including a fuse portion 253 through which a fuse hole 253a is formed, and a connection unit 254 positioned between the first portion 251 and the second portion 252 to couple the first portion 251 and the second portion 252.

Further, the connection unit 254 according to the present example embodiment includes a body 254a coupling the first portion 251 and the second portion 252, and a reinforcement member 254b coupled with the body 254a.

Further, the body 254a according to the present example embodiment includes a first body unit 254a1 coupled to the first portion 251 and a second body unit 254a2 coupled to the second portion.

Further, the first portion 251 according to the present example embodiment includes a plurality of collector shoes 251a extending from the first body unit 254a1 of the connection unit 254, each to be coupled with a plurality of electrode assemblies 10.

The thickness of the reinforcement member 254b according to the present example embodiment may be the same as the thickness of the body 254a including the first body unit 254a1 and the second body unit 254a2.

The reinforcement member 254b according to the present example embodiment may extend from the body 254a and then bent (or folded) to be coupled with the body 254a.

Further, the reinforcement member 254b according to the present example embodiment may include one or more of a first reinforcement member 254b1 coupled with a surface of the body 254a, and a second reinforcement member 254b2 coupled with another surface 541b positioned at an opposite side of a first surface 254a of the body 254a and facing an internal wall of the case 26.

Herein, constitutions of the first reinforcement member 254b1 and the second reinforcement member 254b2 according to the present example embodiment are substantially the same as those of the first reinforcement member 542a and the second reinforcement member 542b according to the first example embodiment of the present invention, respectively.

Further, a coupling relationship of each of the first reinforcement member 254b1 and the second reinforcement member 254b2 according to the present example embodiment with the body 254a is substantially the same as a coupling relationship of each of the first reinforcement member 542a and the second reinforcement member 542b according to the first example embodiment of the present invention with the body 541.

Accordingly, hereinafter, a detailed description of the first reinforcement member 254b1 and the second reinforcement member 254b2 according to the present example embodiment, and a detailed description of the coupling relationship of the first reinforcement member 254b1 and the second reinforcement member 254b2 with the body 254a will be omitted.

According to the present example embodiment, the thickness of the connection unit 254 of the first current collector 250 applied to a plurality of electrode assemblies may be set to be larger than the thickness of the first portion 251 and the second portion 252 of the first current collector, thus increasing the heat capacity, the thermal conductivity, and the durability of the connection unit 254 of the first current collector 250.

Accordingly, the heat capacity of the connection unit 254 according to the present example embodiment is larger than the heat capacity of the first portion 251 and the second portion 252, and the thermal conductivity of the connection unit 254 is larger than the thermal conductivity of the first portion 251 and the second portion 252. Accordingly, the connection unit 254 is not easily heated, and the heat that is generated from the connection unit 254 may be rapidly emitted.

Therefore, according to the present example embodiment, even though charging and discharging of the rechargeable battery 200 are repeated, the connection unit 254 of the first current collector 250 may be prevented from being damaged or deformed.

Further, according to the present example embodiment, even though the external impact is applied to the rechargeable battery 200, the connection unit 254 of the first current collector 250 may be prevented from being damaged or deformed.

Figure 7A:
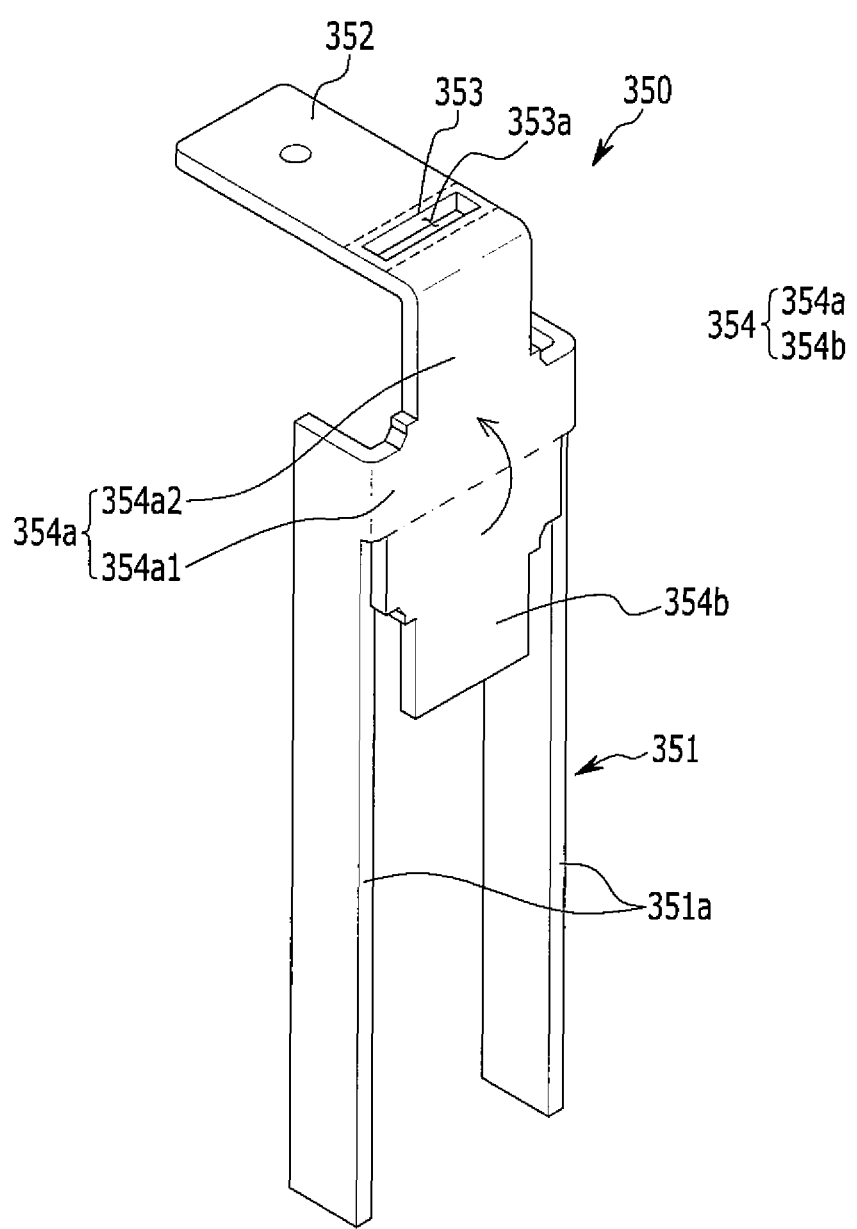
FIGS. 7A and 7B are perspective views of the first current collector according to a third example embodiment of the present invention.
Figure 7B:
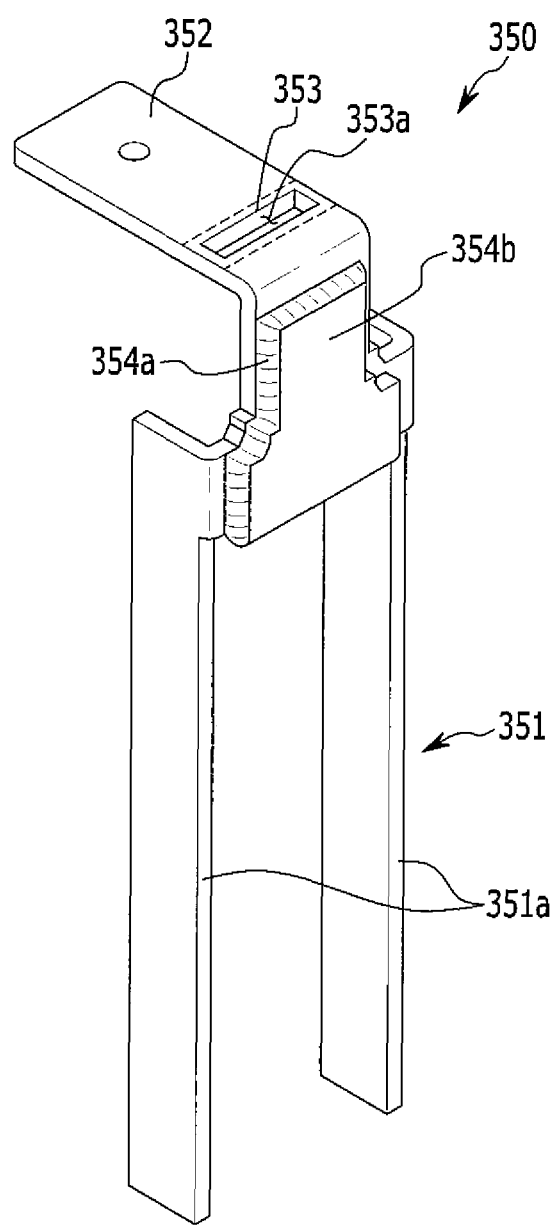

FIGS. 7A and 7B are perspective views of a first current collector according to a third example embodiment of the present invention.

Referring to FIGS. 7A and 7B, the rechargeable battery according to the present example embodiment has substantially the same constitution as the rechargeable battery 200 according to the second example embodiment of the present invention with the exception of the first current collector 350. Accordingly, a detailed description of the same constitution as the rechargeable battery 200 according to the second example embodiment of the present invention will be hereinafter omitted.

The first current collector 350 according to the present example embodiment includes a first portion 351 coupled with the first uncoated region 11*a* of the electrode assembly 10, a second portion 352 coupled with the terminal unit 30 including a fuse portion 353 through which a fuse hole 353*a* is formed, and a connection unit 354 positioned between the first portion 351 and the second portion 352 to couple the first portion 351 and the second portion 352.

Further, the connection unit 354 according to the present example embodiment includes a body 354*a* connecting the first portion 351 and the second portion 352, and a reinforcement member 354*b* coupled with the body 354*a*.

Further, the body 354*a* according to the present example embodiment includes a first body unit 354*a*1 coupled to the first portion 351 and a second body unit 354*a*2 coupled to the second portion 352.

Further, the first portion 351 according to the present example embodiment includes a plurality of collector shoes 351*a* extending from the first body unit 354*a*1 of the connection unit 354, each to be coupled with a plurality of electrode assemblies 10.

The thickness of the reinforcement member 354*b* according to the present example embodiment may be the same as the thickness of the body 354*a* including the first body unit 354*a*1 and the second body unit 354*a*2.

The reinforcement member 354*b* according to the present example embodiment may extend in a direction parallel to the collector shoes 351*a* in the first body unit 354*a*1 and then bent (or folded) to be coupled with the body 354*a*.

Herein, the reinforcement member 354*b* according to the present example embodiment may have a shape corresponding to the shape of the body 354*a* including the first body unit 354*a*1 and the second body unit 354*a*2.

Therefore, according to the present example embodiment, each of the first body unit 354*a*1 and the second body unit 354*a*2 of the connection unit 354 is coupled with the reinforcement member 354*b*. Accordingly, the total thickness of the connection unit 354 is approximately doubled.

According to the present example embodiment, the thickness of the connection unit 354 of the first current collector 350 applied to a plurality of electrode assemblies may be set to be larger than the thickness of the first portion 351 and the second portion 352 of the first current collector, thus increasing the heat capacity, the thermal conductivity, and the durability of the connection unit 354 of the first current collector 350.

Therefore, the heat capacity of the connection unit 354 according to the present example embodiment is larger than the heat capacity of the first portion 351 and the second portion 352, and the thermal conductivity of the connection unit 354 is larger than the thermal conductivity of the first portion 351 and the second portion 352. Accordingly, the connection unit 354 may not be easily heated and the heat that is generated from the connection unit 354 may be rapidly emitted.

Therefore, according to the present example embodiment, even though charging and discharging of the rechargeable battery 300 are repeated, the connection unit 354 of the first current collector 350 may be prevented or reduced from being damaged or deformed.

Further, according to the present example embodiment, even though the external impact is applied to the rechargeable battery 200, the connection unit 354 of the first current collector 350 may be prevented from being damaged or deformed.

While the embodiments of the present invention have been described in connection with what is presently considered to be practical example embodiments, it is to be understood that the invention is not limited to the disclosed embodiments, but, to the contrary, it is intended to cover various modifications and equivalent arrangements included within the scope of the appended claims, detailed description of the invention, drawings, and their equivalents.

| Description of symbols | |
|---|---|
| 100, 200, 300: rechargeable battery | 10: electrode assembly |
| 11: first electrode | 12: second electrode |
| 13: separator | 30: first terminal unit |
| 31: first rivet | 40: second terminal unit |
| 50: first current collector | 51, 251, 351: first unit |
| 52, 252, 352: second unit | 53: fuse unit |
| 53a: fuse hole | 54, 254, 354: connection unit |
| 541, 254a, 354a: body member | 542, 254b, 354b: reinforcement |
| 542a, 254b1: first reinforcement member | |
| 542b, 254b2: second reinforcement member | |
| 60: first insulating member | 70: second current collector |
| 80: second insulating member | |

The invention claimed is:

1. A rechargeable battery comprising:
   a case;
   an electrode assembly accommodated within the case; and
   a current collector having a first portion, a second portion, and a connection unit between the first portion and the second portion, wherein the connection unit comprises a body coupling the first portion with the second portion, the first portion being coupled with the electrode assembly and the second portion being coupled with a first battery terminal unit, and wherein a thickness of the connection unit is greater than a thickness of the first portion of the current collector; and
   a reinforcement member, the reinforcement member comprising a first reinforcement member extending from a first side of the body and a second reinforcement member extending from a second side of the body opposite to the first side, wherein the first reinforcement member is configured to be folded over and coupled to a first planar surface of the body, wherein the second reinforcement member is configured to be folded over and coupled to a second planar surface of the body, and wherein a thickness of the reinforcement member is greater than a thickness of the first portion of the current collector.

2. The rechargeable battery according to claim 1, wherein a thickness of the first reinforcement member and a thickness of the second reinforcement member are substantially identical to a thickness of the body.

3. The rechargeable battery according to claim 1, wherein the thickness of the connection unit is a sum of a thickness of the body and a thickness of the reinforcement member.

4. The rechargeable battery according to claim 1, wherein the connection unit including the body and the reinforcement member has a thermal conductivity that is higher than a thermal conductivity of the first portion and the second portion.

5. The rechargeable battery according to claim 1, wherein a surface area of the connection unit including the body and the reinforcement member is greater than a surface area of the first portion or the second portion of the current collector that is coupled to the terminal unit.

6. The rechargeable battery according to claim 1, wherein the first portion of the current collector comprises a plurality of collector shoes extending from the body.

7. The rechargeable battery according to claim 6, wherein the reinforcement member is between the plurality of collector shoes.

8. The rechargeable battery according to claim 1, wherein the body comprises a first body, and a second body, the first body being coupled with the first portion of the current collector, the second body being coupled with the second portion of the current collector.

9. The rechargeable battery according to claim 8, wherein the reinforcement member extends from the first body.

10. The rechargeable battery according to claim 1, wherein the thickness of the connection unit is greater than a thickness of the second portion of the current collector.

11. The rechargeable battery according to claim 1, wherein a heat capacity of the connection unit is greater than a heat capacity of the first portion and the second portion.

* * * * *